(12) United States Patent
Deckers et al.

(10) Patent No.: US 6,300,430 B1
(45) Date of Patent: Oct. 9, 2001

(54) METHOD FOR COPOLYMERIZING ETHYLENE WITH VINYL CARBOXYLATES

(75) Inventors: Andreas Deckers, Flomborn; Wilhelm Weber, Neustadt; Ulrich Annen, Hassloch, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/508,598

(22) PCT Filed: Sep. 5, 1998

(86) PCT No.: PCT/EP98/05621

§ 371 Date: Mar. 14, 2000

§ 102(e) Date: Mar. 14, 2000

(87) PCT Pub. No.: WO99/14251

PCT Pub. Date: Mar. 25, 1999

(30) Foreign Application Priority Data

Sep. 18, 1997 (DE) .............................. 197 41 097

(51) Int. Cl.[7] ........................................ C08F 2/02
(52) U.S. Cl. ................. 526/64; 526/65; 526/66; 526/73; 526/227; 526/319; 526/348.2; 526/348.5; 526/348.6
(58) Field of Search ................... 526/64, 65, 66, 526/73, 227, 319, 348.2, 348.5, 348.6

(56) References Cited

U.S. PATENT DOCUMENTS

| | | | |
|---|---|---|---|
| 3,917,577 | * | 11/1975 | Trieschmann . |
| 5,227,445 | * | 7/1993 | Berger et al. ................ 526/331 |
| 5,795,940 | * | 8/1998 | Pearce et al. ................ 525/222 |

FOREIGN PATENT DOCUMENTS

| | | | |
|---|---|---|---|
| 24 03 516 | * | 8/1975 | (DE) . |
| 449 092 | * | 10/1999 | (EP) . |
| 979 522 | * | 1/1965 | (GB) . |

OTHER PUBLICATIONS

Ullmanns Enc. Band 19, 167–178.*

* cited by examiner

Primary Examiner—David W. Wu
Assistant Examiner—William Cheung
(74) Attorney, Agent, or Firm—Keil & Weinkauf

(57) ABSTRACT

A process is described for copolymerizing ethylene with vinyl esters and, if desired, with further vinylic comonomers in a tube reactor at pressures of from 500 to 4000 bar and at not more than 220° C., which comprises initiating the free-radical polymerization at at least two locations of the tube reactor by adding a catalyst/initiator and adjusting the temperature profile within the reactor such that the temperature maxima downstream of the initiation locations are from 150 to 220° C. and differ by less than ±10° C. from one another.

7 Claims, No Drawings

METHOD FOR COPOLYMERIZING ETHYLENE WITH VINYL CARBOXYLATES

The present invention relates to a process for copolymerizing ethylene with vinyl esters and, if desired, further vinylic comonomers in a tube reactor at pressures at from 500 to 4000 bar and at not more than 220° C.

The present invention additionally relates to copolymers obtainable by this process, to the use of the copolymers for producing pigment concentrates for coloring plastics, and to pigment concentrates comprising such copolymers.

Copolymers of ethylene and vinyl esters, especially vinyl acetate, with or without further comonomers are generally known and are used, for example, to produce pigment concentrates, known as masterbatches, for coloring plastics. Copolymers that are to be used for this purpose must firstly be able to be mixed very homogeneously with the pigment products in order to achieve a high coloring power and uniform coloration. For this purpose the copolymer itself must be extremely homogeneous. Secondly, the copolymer is required to have good thermal stability, since plastics are generally colored by extrusion at high temperatures.

The literature discloses various processes for preparing ethylene-vinyl acetate copolymers. For instance, DE 15 20 227 describes a process of synthesizing ethylene-vinyl acetate copolymers in a tube reactor. To maximize the completeness and uniformity of the monomer reaction, oxygen as initiator is fed into the tube at two or more locations. The reaction temperature is said to be from 200 to 250° C. Apart from this, nothing is said about the temperature profile along the tube reactor.

U.S. Pat. No. 3,917,577 describes a method of homopolymerizing ethylene in a tube reactor. The polymerization is initiated by feeding the reaction mixture—comprising ethylene, a peroxide initiator and a polymerization regulator—into the tube reactor at from two to three successive locations. The reaction mixtures are fed into the reactor at from 160 to 210° C. All that is said about the temperature progression in the reactor is that the temperature can be from 160 to 350° C.

EP-A 0 475 124 describes ethylene-vinyl acetate copolymers. Preparation takes place by high-pressure polymerization at from 180 to 240° C. Nothing is said either about the possibility of multiple initiation or about the temperature profile within the reactor.

The known ethylene-vinyl acetate copolymers still leave much to be desired in terms of their homogeneity and their thermal stability.

It is an object of the present invention to find a process for preparing ethylene-vinyl ester copolymers that leads to copolymers which have good homogeneity and thermal stability and which lend themselves well to producing pigment concentrates.

We have found that this object is achieved by a process for copolymerizing ethylene with vinyl esters and, if desired, with further vinylic comonomers in a tube reactor at pressures of from 500 to 4000 bar and at not more than 220° C., which comprises initiating the free-radical polymerization at at least two locations of the tube reactor by adding a catalyst/initiator and adjusting the temperature profile within the reactor such that the temperature maxima downstream of the initiation locations are from 150 to 220° C. and differ by less than ±10° C. from one another.

We have also found novel copolymers having improved properties that are obtainable by this process, and the use of these copolymers for producing pigment concentrates for coloring plastics, and such pigment concentrates themselves.

The process of the invention is a typical high-pressure tube reactor process.

The process can be performed using the customary, continuous tubular high-pressure polymerization systems (tube reactors). By tube reactors are meant tubular polymerization vessels in which the length-to-diameter ratio of the pressuretight tubes is generally from 10,000 to 60,000:1. Details of ethylene high-pressure polymerization processes in which tube reactors are utilized are given, for example, in Ullmanns Encyklopädie der technischen Chemie", 1980, 4th edition, Volume 19, pages 167 to 178, Verlag Chemie GmbH, D-6940 Weinheim.

The supercritical mixture of ethylene and vinyl ester with or without regulators and further comonomer is supplied to the reactor in accordance with known methods at the inlet location and, if desired, simultaneously at a further location downstream of the inlet location along the tube reactor in the flow direction of the polymerizing ethylene, where the reaction temperature has exceeded a maximum. By inlet location is meant generally the beginning of the tubular reactor. The principle stream is fed in at the beginning of the reactor, while subsidiary streams can be supplied to the reactor at other locations in a known manner.

In accordance with the process of the invention it is preferred to prepare copolymers in which the proportion of ethylene units is from 80 to 95% by weight, the proportion of vinyl ester units from 5 to 20% by weight and the proportion of further vinylic comonomer units from 0 to 10% by weight, based in each case on the overall mass of the copolymer.

It is optional to operate in the presence of polymerization regulators. These make it possible to adjust the melt index of the resulting ethylene copolymers. Examples of suitable regulators are hydrogen, ketones, aldehydes, alcohols, ethers or linear or branched hydrocarbons. Preference is given to the use of propane, propylene, methyl ethyl ketone or propionaldehyde. The polymerization regulators are generally employed in amounts of from 0.2 to 5 mol percent, based on the ethylene to be polymerized. In one particular embodiment no additional regulators are employed since the vinyl esters used possess regulator properties.

The copolymerization is generally conducted in the absence of a solvent. The small amounts of an inert solvent, such as benzene, mineral oil or other inert solvent, in which the polymerization initiators are dissolved can be disregarded in relation to the other starting materials. If oxygen is employed as polymerization initiator, there is no need for any solvent at all.

Appropriate vinyl esters are all vinyl esters which can be copolymerized with ethylene under the stated temperature and pressure conditions. Examples of such comonomers are vinyl esters of carboxylic acids having 1 to 8, preferably 1 to 6 carbon atoms. Particular preference is given to vinyl acetate. Mixtures of different vinyl esters can also be employed.

The ethylene is copolymerized with the vinyl esters in the presence of free-radical initiators. By free-radical polymerization initiators are meant those catalysts which are also used for the high-pressure homopolymerization of ethylene. A suitable example is oxygen, judiciously in amounts of from 2 to 100 mol-ppm, based on the ethylene to be polymerized. Also suitable are peroxides and other free-radical initiators, and mixtures of peroxides having different decomposition points, and hydroperoxides and also mixtures of oxygen and peroxides and/or hydroperoxides. Examples of peroxides and hydroperoxides are tert-butyl peroxypivalate, di-tert-butyl peroxide, tert-butyl hydroperoxide, tert-butyl perbenzoate, p-menthane hydroperoxide and dilauroyl peroxide. Free-radical polymerization initiators also mean compounds such as azoisobutyronitrile. Mixtures of oxygen and one or more peroxides can also be used. The copolymerization of ethylene with vinyl esters is preferably initiated by means of one or more peroxide compounds.

In minor amounts the reaction mixture may also include further comonomers such as propene, butene, pentene, hexene and higher olefins and also mixtures of olefins.

Copolymerization preferably takes place at pressures of from 1000 to 3000 bar, with particular preference from 1500 to 2500 bar. The temperature should not exceed 220° C., since otherwise the vinyl ester is cleaved in detectable amounts and the corresponding acid is liberated. This impairs the thermal stability of the copolymers. The temperature maxima are preferably from 180 to 220° C., with particular preference from 200 to 220° C.

The free-radical polymerization is initiated at at least 2 locations in the tubular reactor, preferably at 3, 4 or 5 locations and, with particular preference, at 4 locations of the tube reactor, by adding the catalyst/initiator. One location is judiciously situated at the beginning of the reactor, the others being distributed along the reactor such that a temperature regime of maximum uniformity is obtained. Downstream of these initiation locations there is an increase in temperature owing to the exothermic polymerization. It is important that the rate of throughput and the amounts of initiator added are harmonized such that the temperature maxima downstream of the initiation locations are from 150 to 220° C. and differ by less than ±10° C., preferably by less than ±5° C. and, with particular preference, by less than ±2° C. from one another.

The copolymers obtainable by the process of the invention feature a hitherto unknown homogeneity and thermal stability. They are therefore outstandingly suitable for use in the production of pigment concentrates for coloring plastics.

These pigment concentrates can be produced in a known manner, for instance by melt extrusion. Especially advantageous for this application are copolymers having a viscosity of from 800 to 1500 cst at 120° C. The desired viscosity is generally established by the use of appropriate regulators (as described above) in the course of the polymerization.

The homogeneity of the pigment concentrates of the invention makes them outstandingly suitable for coloring plastics, especially polyethylene and ethylene copolymers. They show excellent coloring properties and good thermal stability.

EXAMPLES

Copolymerizations were conducted in a tube reactor 200 m in length and 15 mm in diameter with a throughput of 1400 kg of ethylene and 41 kg of vinyl acetate/hour. The monomer mixture was fed in at a location at the beginning of the reactor together with propionaldehyde as regulator (3.5 kg/hour). Before the first initiation the monomer mixture was preheated to 170° C. The pressure in the reactor was 2300 bar. Initiation took place by adding a solution of 0.05 M tert-butyl perpivalate (TBPP) and 0.05 M tert-butyl perisononanoate (TBPiN) in isododecane at 4 locations on the reactor (with a distance of the addition locations from one another of about 50 m). The temperature (T1, T2, T3, and T4) was measured at 20 m intervals along the reactor and the temperature maxima were adjusted to the desired levels by regulating the addition of initiator.

The resulting copolymers were examined for thermal stability (measured as the weight loss after heating for 60 minutes at 220° C.) and color strength. The color strength was determined by photometry on extrudates comprising 25% by weight ultramarine blue pigment, 15% by weight copolymer (coextruded with one another first of all) and 60% by weight of polyethylene (Lupolen® 1840 D, BASF) and was compared with the Comparative Example V-3.

The following table shows the results of the experiments. The copolymers prepared in accordance with the invention exhibit a higher color strength than conventionally prepared copolymers and at the same time have excellent thermal stability.

TABLE

| Example-No. | T1 [° C.] | T2 [° C.] | T3 [° C.] | T4 [° C.] | VAC [% by wt.] | Viscosity [cst.] | Conversion [%] | Thermo-stability [%] | Color strength [%] |
|---|---|---|---|---|---|---|---|---|---|
| 1 | 218 | 216 | 217 | 218 | 14.1 | 1280 | 15 | 0.21 | 125 |
| 2 | 203 | 202 | 199 | 201 | 13.9 | 1220 | 12 | 0.19 | 120 |
| V-1* | 238 | 237 | 242 | 241 | 14.3 | 1290 | 18 | 0.69 | 105 |
| V-2* | 198 | 203 | 221 | 218 | 13.9 | 1310 | 13 | 0.20 | 95 |
| V-3* | 201 | 219 | 221 | 239 | 14.4 | 1600 | 14 | 0.38 | 100 |

*comparative experiments not in accordance with the invention

We claim:

1. A process for copolymerizing ethylene with vinyl esters and, optionally, with further vinylic comonomers, in a tube reactor at pressures of from 500 to 4000 bar and at not more than 220° C., which comprises initiating the free-radical polymerization at at least two locations of the tube reactor by adding at said at least two locations a catalyst/initiator only and adjusting the temperature profile within the reactor such that the temperature maxima downstream of the initiation locations are from 150 to 220° C. and differ by less than 10° C. from one another.

2. A process as claimed in claim 1, wherein the proportion of the ethylene units is from 80 to 95% by weight, the proportion of the vinyl ester units is from 5 to 20% by weight and the proportion of other vinylic comonomer units is from 0 to 10% by weight, based in each case on the overall mass of the copolymer.

3. A process as claimed in claim 1, wherein the vinyl ester employed is vinyl acetate.

4. A process as claimed in claim 1, wherein the catalyst/initiator is injected into the tube reactor at 3, 4 or 5 locations.

5. A process as claimed in claim 1, wherein the temperature maxima differ by less than ±5° C. from one another.

6. A process as claimed in claim 1, wherein the temperature maxima differ by less than 5° C. from one another.

7. A copolymer obtainable by a process as claimed in claim 1.

* * * * *